Figure 1:
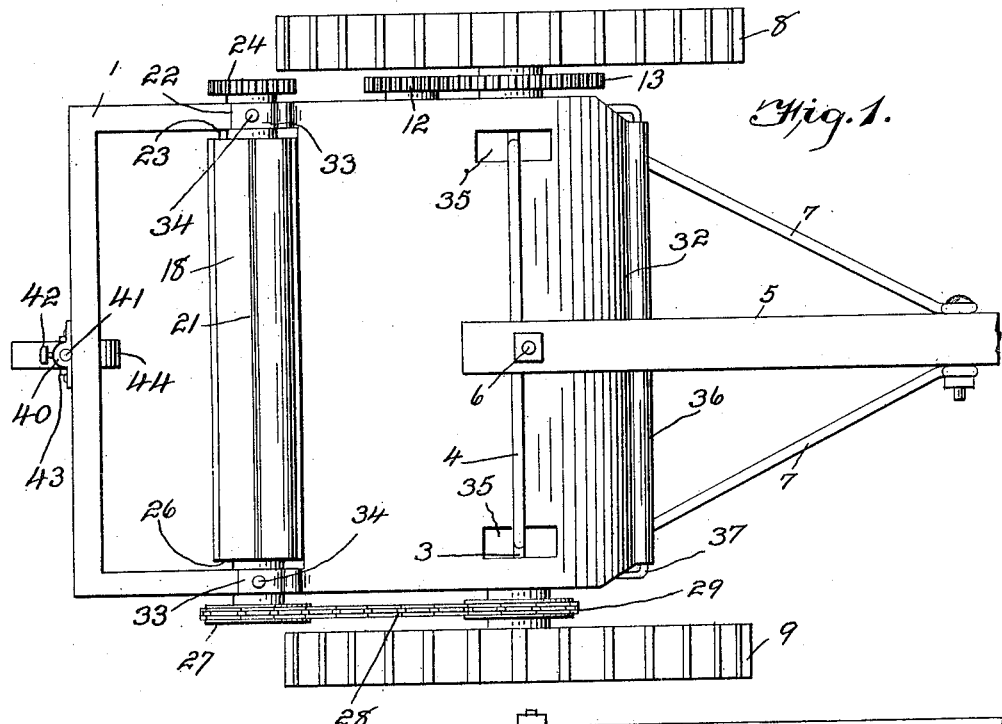

J. E. & H. J. HUBERT.
COTTON STALK PULLER AND CUTTER.
APPLICATION FILED MAY 29, 1914.

1,110,785.

Patented Sept. 15, 1914.
2 SHEETS—SHEET 1.

Witnesses
T. P. Britt
Francis L. Boswell

Inventors
J. E. Hubert
H. J. Hubert
By D. Swift & Co.
Attorneys

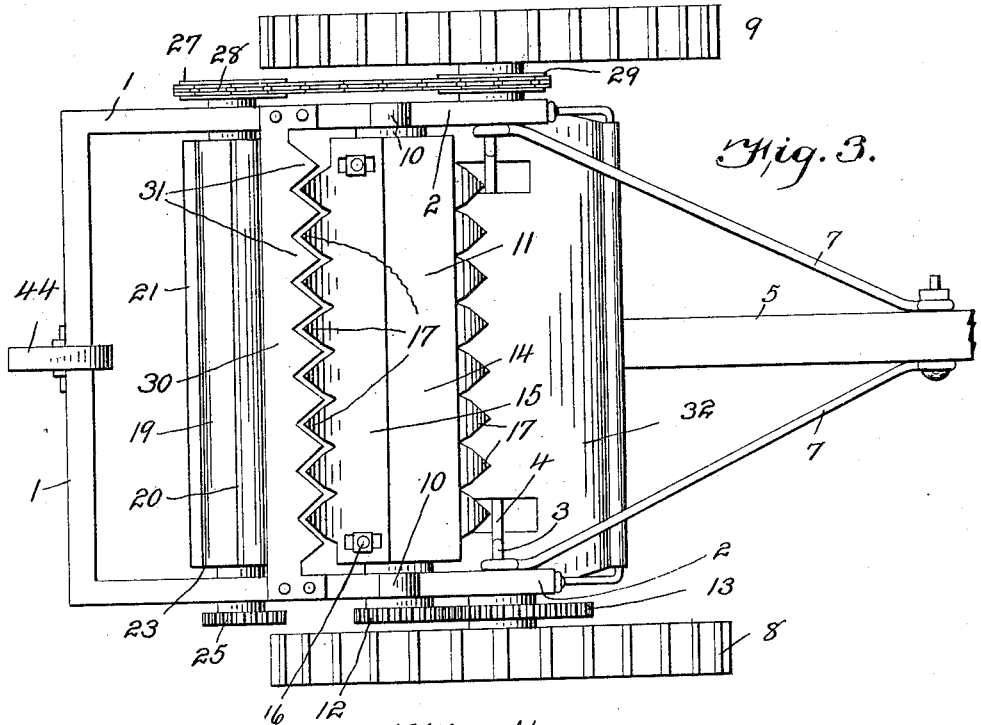
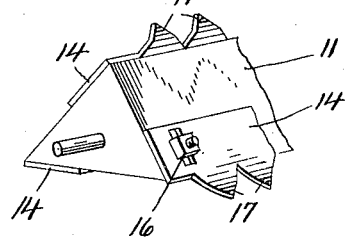
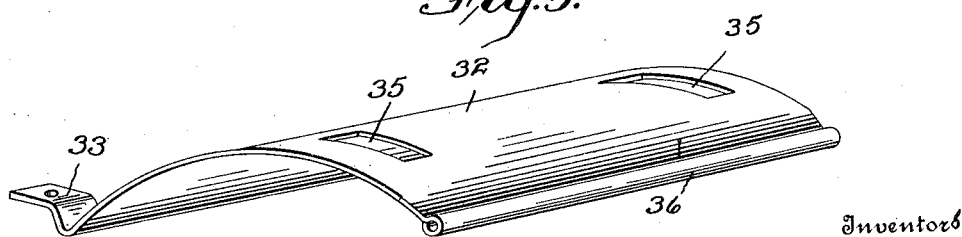

UNITED STATES PATENT OFFICE.

JOHN E. HUBERT AND HENRY J. HUBERT, OF COOPER, TEXAS.

COTTON-STALK PULLER AND CUTTER.

1,110,785. Specification of Letters Patent. Patented Sept. 15, 1914.

Application filed May 29, 1914. Serial No. 841,807.

*To all whom it may concern:*

Be it known that we, JOHN E. HUBERT and HENRY J. HUBERT, citizens of the United States, residing at Cooper, in the county of Delta and State of Texas, have invented a new and useful Cotton-Stalk Puller and Cutter; and we do hereby declare the following to be a full, clear, and exact description of the invention, such as will enable others skilled in the art to which it appertains to make and use the same.

This invention relates to a new and useful cotton stalk puller and cutter.

An object of the invention is the provision of a machine of this nature comprising a frame mounted upon traction wheels and provided with a revoluble stalk puller triangular in cross section, each corner of which is provided with stalk pulling teeth. This revoluble stalk puller has a gear at one end having gear connections with one of the traction wheels, and is designed to revolve twice as fast as the gear which is carried by one of said wheels, so that said teeth will firmly grip the stalks, and owing to the fast revolution of the puller quick pulling actions are imparted upon the stalks extracting them from the ground, and tending in some instances to cut the stalks.

Another feature of the invention is the provision of a pair of rollers having gear connections with one of the traction wheels, and between which rollers the stalks are deflected by means of a shield, whereby the same are cut in small pieces.

In practical fields the details of construction may be subjected to alterations, falling within the scope of what is claimed.

The invention comprises further features and combinations of parts, as hereinafter set forth, shown in the drawings and claimed.

Figure 2:
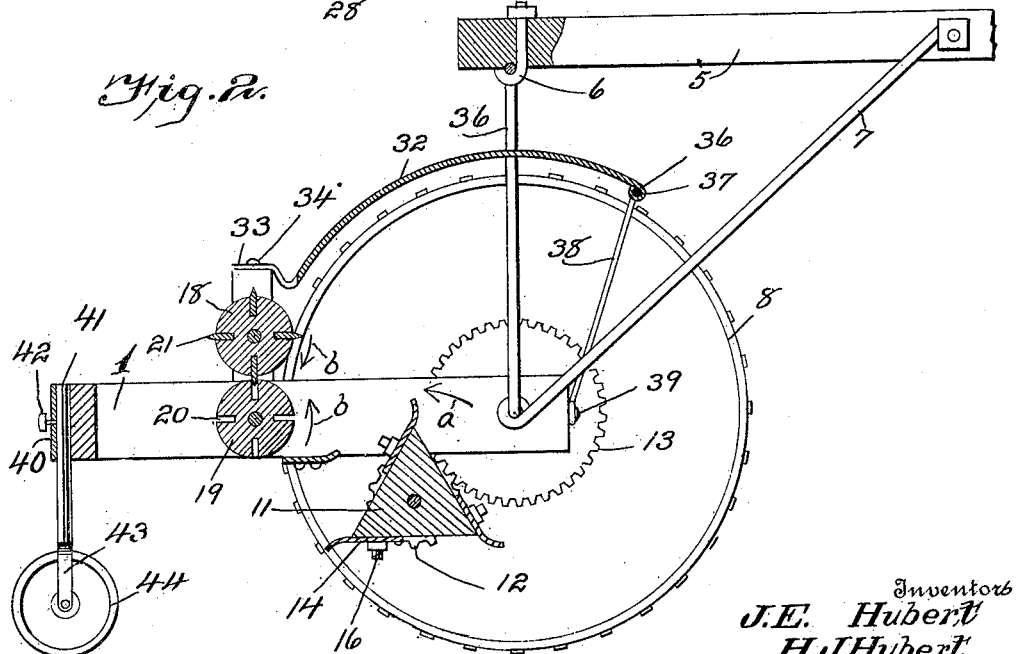

In the drawings:—Figure 1 is a plan view of a cotton stalk puller and cutter. Fig. 2 is a longitudinal sectional view of Fig. 1. Fig. 3 is a bottom plan view. Fig. 4 is a detail perspective view of the revoluble stalk puller. Fig. 5 is a detail view of the shield or hood.

Referring more especially to the drawings, 1 designates a frame, which is U-shaped in plan view, in the ends 2 of which the angular ends 3 of the arched axle 4 have bearings. A tongue or pole 5 is fastened to the arch of said arched axle by means of a hooked bolt 6, which is carried by the tongue or pole. Brace rods 7 are connected to the tongue, and their rear ends have eyes which receive the angular ends of the arched axle. Upon the angular ends of the axle, traction wheels 8 and 9 are loosely mounted. Mounted in bearings 10 of the lower part of the frame 1 adjacent its ends 2 are the pintles of the revoluble cotton stalk puller 11. One pintle of this revoluble puller has a gear 12, meshing with a gear 13 which revolves with and is carried by the traction wheel 8, so as to impart motion to the revoluble puller in the direction of the arrow *a*. The revoluble puller is triangular in cross section, as shown, and upon the flat faces 14 plates 15 are adjustably bolted, as shown at 16. These plates are provided with series of teeth 17 of the shape shown, which are bent, and not only disposed at angles to the bodies of said plates, but are also disposed at angles to the flat surfaces of the revoluble puller. These teeth are disposed adjacent the corners of the puller and extend beyond the same, and owing to the adjustability of the plates, said teeth may be adjusted farther outwardly from said corners or inwardly. The purpose of making the revoluble puller triangular in cross section is to permit the teeth to have a great pulling action upon the stalks, and furthermore to prevent the cotton stalks or the like from being dislodged from between the teeth, which would be the case if the puller were cylindrical, for the reason that the cylindrical surfaces, in lieu of the flat surfaces would tend to strike the stalks and dislodge the same from between the teeth. Not only do the teeth act to pull the stalks, but also tend to cut the same, and owing to the gear of the traction wheel 8 being twice as large in diameter than the gear of one of the pintles of the puller, the revoluble puller receives very fast revolutions, which tend to throw the stalks toward the chopping or cutting rolls 18 and 19. The roll 19 is more of an impression roller than a cutting roller, and is mounted in the frame 1. The roller 19 has longitudinal grooves 20 to receive the cutting knives or blades 21 of the roller 18, which is mounted in bearings 22 rising upwardly from the frame 1. The ends 23 of the cutting and impression rollers 18 and 19 have gear connections 24 and 25. The end 26 of the roller 18 has a sprocket wheel 27, which has a sprocket chain connection 28 with the sprocket wheel 29 of the traction wheel 9, and owing to the sprocket wheel 29 being carried by and rotatable with the traction wheel 9, motions in the direction of the arrows *b* are imparted to the rollers 18 and 19, thereby cutting or chopping the stalks as they are pulled. Some of the stalks as they are pulled by the revoluble puller are cut or severed before they reach the rollers 18 and 19. Secured to the under portions of the sides of the frame 1 is a blade 30 having a series of teeth 31, with which the teeth of the revoluble puller intermesh, so as to remove the stalks from the teeth of the puller, in other words, clean the same. A semicylindrical shield or hood constructed of sheet metal and designated by the numeral 32 is provided with ears 33 bolted at 34 to the bearings 22 is arranged as shown in the drawings. This hood or shield curves upwardly and forwardly toward the tongue or pole, and has slots 35, through which the vertical portions 36 of the arch of the axle extend. The forward portion of the shield or hood terminates in a roll 36, through which a wire in which a wire 37 is arranged. This wire or rod 37 has angular ends 38, the extremities of which are bolted at 39 to the ends of the sides of the frame 1, and constitute braces or reinforcing rods between the shields or hood and said frame. The rear portion of the frame 1 has a bearing 40, in which a rod 41 is adjustably mounted by means of a set screw 42. The lower end of the rod 41 terminates in a fork 43, in bearings of which a caster wheel 44 is mounted, designed to engage the ground or soil, for the purpose of steadying the machine as it moves forwardly. As the machine moves forwardly the stalks are pulled or extracted from the ground by means of the revoluble member or puller, some of them being cut at the same time, and are then thrown between the rollers 18 and 19, where they are further severed in smaller pieces.

The invention having been set forth, what is claimed as new and useful is:—

1. A stalk puller and chopper comprising a frame, traction wheels therefor, a revoluble puller mounted in bearings of said frame, said puller being triangular in cross section and provided with plates upon its flat surfaces having teeth projecting beyond and adjoining the corners of the triangular shaped puller, a tooth blade secured to the frame with which the teeth of the revoluble puller intermesh, and means of connection between said revoluble puller with one of the traction wheels for imparting revoluble motion to the puller.

2. In a cotton stalk puller and chopper, a frame, traction wheels therefor, chopping rollers mounted on the frame, a revoluble stalk puller and cutter mounted in bearings of said frame, said puller comprising a body member triangular in cross section, plates secured to the flat faces of the triangular body and having teeth projecting beyond and adjoining the corners of the triangular body, a blade secured to the under portion of the frame having teeth with which the teeth of said plates intermesh, gear connections between the chopping rollers and one of the traction wheels, and gear connections between the puller and the other traction wheel.

3. In a cotton stalk puller and chopper, a frame, traction wheels therefor, a revoluble stalk puller and cutter mounted in bearings of said frame, said puller comprising a body member triangular in cross section, plates adjustably secured to the flat faces of the triangular body and having teeth projecting beyond and adjoining the corners of the triangular body, and gear connections between the revoluble puller and one of the traction wheels to impart motion thereto.

4. In a cotton stalk puller and chopper, a frame, traction wheels therefor, chopping rollers mounted on the frame, a revoluble stalk puller and cutter mounted in bearings of said frame, said puller comprising a body member triangular in cross section, plates adjustably secured to the flat faces of the triangular body and having teeth projecting beyond and adjoining the corners of the triangular body, a blade secured to the under portion of the frame having teeth with which the teeth of said plates intermesh, gear connections between the chopping rollers and one of the traction wheels, and gear connections between the puller and the other traction wheel, a shield or hood mounted on the frame and arching forwardly, the teeth of the plates on the puller being disposed at angles to the body of the plates.

In testimony whereof we have signed our names to this specification in the presence of two subscribing witnesses.

JOHN E. HUBERT.
HENRY J. HUBERT.

Witnesses:
F. H. CAMPBELL,
MATTIE McBURNETT.